United States Patent
Filippis et al.

(10) Patent No.: US 12,525,322 B2
(45) Date of Patent: Jan. 13, 2026

(54) METHOD FOR THE QUALITATIVE EVALUATION OF REAL-TIME PCR DATA

(71) Applicant: EUROIMMUN Medizinische Labordiagnostika AG, Luebeck (DE)

(72) Inventors: Christodoulos Filippis, Kastorf (DE); Ulf Steller, Buchholz (DE); Fiona Schilling, Luebeck (DE)

(73) Assignee: EUROIMMUN Medizinische Labordiagnostika AG, Luebeck (DE)

( * ) Notice: Subject to any disclaimer, the term of this patent is extended or adjusted under 35 U.S.C. 154(b) by 265 days.

(21) Appl. No.: 17/757,464

(22) PCT Filed: Dec. 18, 2020

(86) PCT No.: PCT/EP2020/087029
§ 371 (c)(1),
(2) Date: Aug. 3, 2022

(87) PCT Pub. No.: WO2021/123171
PCT Pub. Date: Jun. 24, 2021

(65) Prior Publication Data
US 2023/0022761 A1   Jan. 26, 2023

(30) Foreign Application Priority Data
Dec. 20, 2019 (EP) ..................... 19218829

(51) Int. Cl.
*G16B 40/10* (2019.01)
*C12Q 1/6851* (2018.01)
*G16B 25/20* (2019.01)

(52) U.S. Cl.
CPC ........... *G16B 40/10* (2019.02); *C12Q 1/6851* (2013.01); *G16B 25/20* (2019.02)

(58) Field of Classification Search
None
See application file for complete search history.

(56) References Cited

U.S. PATENT DOCUMENTS

| | | |
|---|---|---|
| 2002/0042051 A1 | 4/2002 | Wittwer |
| 2006/0008809 A1 | 1/2006 | Li et al. |

FOREIGN PATENT DOCUMENTS

| | | |
|---|---|---|
| WO | 2006/108205 | 10/2006 |
| WO | 2019/168261 | 9/2019 |

OTHER PUBLICATIONS

Yuan, Joshua S., et al. "Statistical analysis of real-time PCR data." BMC bioinformatics 7 (2006): 1-12. (Year: 2006).*
(Continued)

*Primary Examiner* — Karlheinz R. Skowronek
*Assistant Examiner* — Mary C Leverett
(74) *Attorney, Agent, or Firm* — Grüneberg and Myers PLLC

(57) ABSTRACT

A method is used for the qualitative evaluation of real-time PCR data, where a time/PCR amplification plot of an associated sample is classified as a negative plot or as a positive plot. The method involves providing a real-time PCR amplification plot to be classified, plotting at least 20 successive amplitude values of corresponding successive PCR cycle indices of the sample. Next, a quality metric is determined, on the basis of the at least one amplitude value. A first criterion is determined by a comparison of the quality metric with a first standard value. A sequence of values is then determined, which indicates a gradient of the PCR amplification plot to be classified, and a second criterion is determined as to whether the sequence of values exceeds a second standard value. Finally, the real-time PCR amplification plot is classified as a positive plot if all the criteria given above are satisfied.

18 Claims, 10 Drawing Sheets

(56) References Cited

OTHER PUBLICATIONS

Ruijter, Jan M., et al. "Evaluation of qPCR curve analysis methods for reliable biomarker discovery: bias, resolution, precision, and implications." Methods 59.1 (2013): 32-46. (Year: 2013).*
Kubista, Mikael, et al. "The real-time polymerase chain reaction." Molecular aspects of medicine 27.2-3 (2006): 95-125. (Year: 2006).*
International Search Report dated Mar. 11, 2021, in PCT/EP2020/087029, with English translation, 6 pages.
Written Opinion dated Mar. 11, 2021, in PCT/EP2020/087029, with English translation, 18 pages.
Extended European Search Report dated May 29, 2020, in European Application No. 19218829.0, with English translation, 24 pages.

* cited by examiner

| EURORealTime Zika virus | | Prediction by described method | |
|---|---|---|---|
| | | detected | not detected |
| Evaluation according to the test instructions | detected | 2921 | - |
| | not detected | 2 | 1937 |

T11

| | Correspondence |
|---|---|
| | 0.9996 |

T12

| EURORealTime MTB | | Prediction by described method | |
|---|---|---|---|
| | | detected | not detected |
| Evaluation according to the test instructions | detected | 2058 | - |
| | not detected | 1 | 1332 |

T21

| | Correspondence |
|---|---|
| | 1.0000 |

T22

| EURORealTime HSV1/-2 | | Prediction by described method | |
|---|---|---|---|
| | | detected | not detected |
| Evaluation according to the test instructions | detected | 8046 | - |
| | not detected | 1 | 3348 |

T31

| | Correspondence |
|---|---|
| | 0.9999 |

METHOD FOR THE QUALITATIVE EVALUATION OF REAL-TIME PCR DATA

CROSS-REFERENCE TO RELATED APPLICATIONS

This application is the National Stage entry under § 371 of International Application No. PCT/EP2020/087029, filed on Dec. 18, 2020, and which claims the benefit of priority to European Application No. 19218829.0, filed on Dec. 20, 2019. The content of each of these applications is hereby incorporated by reference in its entirety.

BACKGROUND OF THE INVENTION

Field of the Invention

Real-time PCR (polymerase chain reaction) is a method for detecting specific nucleic acids, e.g. DNA (deoxyribonucleic acid) or RNA (ribonucleic acid), in a sample. Such a sample is preferably a biological sample.

Description of Related Art

In the course of a PCR, relevant, characteristic pieces of nucleic acids are multiplied. Two so-called primers, also called starter DNA molecules, define for this purpose which region of a nucleic acid is to be copied. If the sample contains a nucleic acid section matching the primers, which is also called the target sequence, the primers can thus bind thereon and in the course of a cycle a copied target sequence can be produced. The PCR process passes through multiple cycles, wherein different temperature conditions prevail in the sample and different reactions run in the course of a cycle. Due to the processing of multiple cycles, multiplication of the target sequence then takes place upon the presence of primers matching the nucleic acid.

In the case of a specific detection of RNA in a sample, initially the RNA is rewritten by means of the enzyme reverse transcriptase into DNA. This step is omitted in the case of a specific detection of DNA. Within a PCR cycle, in a first step, the so-called denaturing, the sample is then heated to approximately 94 to 98° C. to separate the DNA strands from one another. In a second step of the PCR cycle, the primer hybridization, the temperature is then kept at a predetermined value, which is, for example, 55-65° C., for a specific time period. In this second step, the primers then bind to the matching DNA sections. In a third step of the PCR cycle, the elongation, the DNA polymerase fills in the missing strands using free nucleotides. For a predetermined time period of, for example, 30 seconds, temperature conditions of approximately 68-72° C. then prevail in the sample. If necessary, primer hybridization and elongation can also be a combined step within a cycle having identical reaction conditions. A PCR cycle thus has three steps or three phases, namely denaturing, primer hybridization, and elongation.

SUMMARY OF THE INVENTION

In the context of a real-time PCR, in addition to specific primers, either DNA-intercalating fluorescent pigments (for example SYBR Green I) or sequence-specific fluorescence-labeled DNA probes (FRET probes, such as TaqMan probes, Molecular Beacons, or the like) are used to track the DNA multiplication in real time via the fluorescence increase. At the end of each PCR cycle, the fluorescence intensity is optically measured. An increase of the fluorescence intensity only takes place when a multiplication of the DNA has taken place. If the specific nucleic acid target sequences are absent in the sample, the primers and the fluorescence-labeled DNA probes or fluorescent pigments cannot bind: no DNA multiplication and thus also no increase of the fluorescence signal or the fluorescence intensity takes place.

FIG. 1 shows for this purpose by way of example a diagram D, in which a fluorescence intensity F is plotted over a cycle time Z. The first amplification curve KA represents the fluorescence signal F in the case that a target sequence matching the specific primers and possibly fluorescence-labeled DNA probes, preferably a matching DNA section, is present in the sample material. The fluorescence intensity F of the curve KA therefore rises in a sigmoid manner. A further exemplary amplification curve K1 having chronologically successive amplitude values of corresponding chronologically successive cycle indices, here with cycle index 0 to 45, is shown in FIG. 6.

FIG. 1 furthermore shows a second amplification curve KB, which represents the case that no matching nucleic acid section is present in the sample as the target sequence matching the specific primers and possibly fluorescence-labeled DNA probes. A slight increase of the fluorescence F can possibly also be observed in the curve KB due to other effects.

The principal object is to recognize whether a sample is positive, thus whether the examined sample contains material to be detected or a specific nucleic acid or a specific nucleic acid section or not. Therefore, an amplification curve has to be classified as a positive curve or a negative curve. A positive curve has a nearly sigmoid curve profile. A positive curve in particular has an initiation phase, furthermore a linear phase, and a plateau phase. A negative curve has an approximately linear curve profile.

The decision to classify an amplification curve as a positive curve is equivalent in the meaning of this application to the decision that it is established that the examined sample material contains a specific nucleic acid or a specific nucleic acid section. The specific nucleic acid can also be referred to as a nucleic acid to be detected or as a nucleic acid section to be detected. The decision to classify an amplification curve as a negative curve is equivalent in the meaning of this application to the decision that it is established that the examined sample material does not contain a specific nucleic acid or a specific nucleic acid section. The specific nucleic acid can also be referred to as a nucleic acid to be detected or as a nucleic acid section to be detected.

FIG. 2 shows a principal procedure for the simultaneous examination or processing of multiple samples P, PX in a joint test run with identical processing conditions. In the course of the examination of a specific sample P, a PCR mix PM, consisting of specific primer material, fluorescent pigments or fluorescence-labeled DNA probes and further reaction components (e.g. buffers, deoxyribonucleoside triphosphates, salts, polymerases, additives, possibly others) is admixed to the sample P. The same can be carried out for further samples PX. This sequence can take place jointly or simultaneously as a joint or simultaneous test run for multiple different samples P, PX. The respective samples P, PX are then located in respective reaction vessels RS, which are preferably provided by respective depressions of a microtiter plate. At the same time, respective control samples KP can then also be provided in corresponding respective reaction vessels. A positive control PK or positive control sample then certainly has the material to be detected or the nucleic acid section (target sequence) to be detected. PCR mix PM is also admixed to the positive control sample PK. The same is carried out for a negative control sample NK, which certainly does not have the nucleic acid section (target sequence) to be detected nor the material to be detected. The negative control sample is then also transferred into a corresponding reaction vessel.

Reaction vessels RS filled in this way or the microtiter plate can then be inserted into a temperature-controllable holder of the real-time PCR device G. In the just-mentioned real-time PCR device G, a temperature profile of the polymerase chain reaction is then run through in the above-mentioned different steps for multiple cycles for processing the samples P, NK, PK under identical processing conditions. A corresponding fluorescence value is then measured and recorded after each cycle for each sample P, NK, PK. The corresponding resulting real-time PCR amplification curves of the respective samples P, NK, PK can then be displayed in a display A. The entirety made up of the sample P, the negative control sample NK and the positive control sample PK can thus be processed in a joint test run under common conditions.

As mentioned above, the object is to classify a real-time PCR amplification curve of the sample P as a negative curve or a positive curve. In other words, this can be expressed as the decision as to whether the sample P contains specific material to be detected or a specific nucleic acid section to be detected, also called nucleic acid target sequence, or not.

A method according to the invention is proposed for this purpose.

The object according to the invention is achieved by a proposed method for qualitative evaluation of real-time PCR data, wherein a real-time PCR amplification curve of an associated sample is classified as a negative curve or as a positive curve. The method has different steps. In one step, a real-time PCR amplification curve to be classified having at least 20 chronologically successive amplitude values of corresponding chronologically successive PCR cycle indices of an associated sample is provided. The at least 20 chronologically successive amplitude values represent a data set which adequately represents an overall profile of the PCR curve. The provision preferably takes place in the form of digital data. In a next step, a quality metric is determined, preferably a single quality metric, which indicates a similarity of the real-time PCR amplification curve to be classified to a straight line, on the basis of the at least 20 chronologically successive amplitude values of corresponding chronologically successive PCR cycle indices. In particular, the PCR amplification curve has at least 25, preferably at least 30, particularly preferably at least 35, very particularly preferably at least 40 chronologically successive amplitude values of corresponding chronologically successive PCR cycle indices. The quality metric, preferably the single quality metric, is preferably determined on the basis of the at least 20, in particular the at least 25, preferably at least 30, particularly preferably at least 35, very particularly preferably at least 40 chronologically successive amplitude values.

In a further step, a first criterion is determined via a comparison of the quality metric to a first predefined value, wherein the first criterion is met if the quality metric falls below the first predefined value. In a further step, a value sequence is determined, which indicates a slope of the real-time PCR amplification curve to be classified, and a second criterion is determined, as to whether the value sequence exceeds a second predefined value, wherein the second criterion is met if at least one value of the value sequence exceeds the second predefined value. Finally, the real-time PCR amplification curve of the associated sample is classified as a positive curve in the case that all above-mentioned criteria are met.

In a first preferred embodiment, the quality metric is the coefficient of determination of the linear regression, also called empirical coefficient of determination; this coefficient of determination is also called the $R^2$ value. In a second preferred embodiment, the quality metric is the standard error of regression or the standard error of linear regression.

The method according to the invention provides the advantage that it is not only based on whether as a first criterion a similarity of the amplification curve in relation to a straight line is provided or whether a quality metric, which indicates that the curve extends linearly, is compared to a predefined value. According to the invention, the value sequence is also determined, which indicates the slope of the amplification curve, and a second criterion is checked as to whether this slope exceeds a predefined value. In this way, it is thus considered as an additional criterion whether the slope of the amplification curve is sufficiently strong in one of the observed cycle ranges. In other words: it is thus not only checked whether the amplification curve deviates sufficiently from a straight line but also whether the slope of the amplification curve is sufficiently large. In this way, two criteria are linked to check whether the amplification curve deviates from a simple straight line.

In particular, an advantage according to the invention is that on the basis of the at least 20 amplitude values, an in particular single quality metric, which indicates a similarity of the real-time PCR amplification curve to be classified to a straight line, is ascertained and then compared to a predefined value to ascertain the first criterion. Therefore, multiple respective quality metrics for respective sections of the amplification curve do not have to be ascertained and these multiple quality metrics do not then have to be incorporated in an assessment of the amplification curve. It is sufficient according to the invention that one, in particular a single, quality metric is ascertained and compared to the first predefined value and that also only at least one value of the value sequence, which indicates a slope of the real-time PCR amplification curve to be classified, exceeds the second predefined value. This solution according to the invention is less computing-intensive than methods in which, for respective multiple sections of an amplification curve, respective parameter values have to be ascertained and then these multiple parameter values of the multiple sections once again have to be entered into a final assessment or these have to be combined by computation. Furthermore, the at least 20 amplitude values represent a sufficient overall profile of the real-time PCR amplification curve. In this way, a more reliable classification of the amplification curve as a positive curve is achieved than in the prior art, according to which only a comparison of the amplification curve to a straight line is considered.

Advantageous embodiments of the invention are explained in more detail in the following description partially with reference to the figures.

Preferably, the PCR amplification curve does not have the amplitude values of the first 3, preferably the first 4, particularly preferably the first 5 PCR cycle indices, so that these remain unconsidered. This permits not allowing early amplitude values to be incorporated in the assessment, since such early amplitude values sometimes have undesired interfering variables and do not follow the zero line, which should actually be the case.

The method preferably includes filtering of the value sequence, which indicates a slope of the real-time PCR amplification curve to be classified, via a median filter and determination of a further criterion as to whether the median-filtered value sequence exceeds a third predefined value. Furthermore, the method preferably includes classifying the real-time PCR amplification curve of the associated sample as a positive curve in the case that all above-mentioned criteria are met. This further criterion catches further undesired error cases. By determining this further criterion on the basis of the third predefined value, it is advantageously checked whether the slope meets further criteria. This enables an even more reliable determination of the result or more reliable classification of amplification curve of the sample as a positive curve.

Furthermore, the method preferably includes
providing a real-time PCR amplification curve of a positive control sample and a real-time PCR amplification curve of a negative control sample,
determining a first secondary criterion as to whether the last fluorescence value of the real-time PCR amplification curve of the positive control sample has exceeded a minimum value,
determining a second secondary criterion as to whether the last fluorescence value of the real-time PCR amplification curve of the negative control sample has not exceeded a maximum value,
and classifying the real-time PCR amplification curve of the associated curve as not valid if at least one of the secondary criteria is not met.

In principle, it is possible that while the real-time PCR is carried out, processing errors can take place, for example with respect to the temperature profile, which would become noticeable, for example, in that the last fluorescence value of the amplification curve of the positive control sample does not exceed a minimum value. The last fluorescence value of the amplification curve of the negative control sample also actually cannot exceed a specific maximum value, which could be infringed as a condition if the negative sample were contaminated with the target sequence to be detected. This is because the last fluorescence value of the amplification curve of the negative control sample would then exceed the predefined value or the maximum value.

Therefore, by way of these further criteria, it is possible to detect incorrect processing in the course of the PCR and then avoid classifying the amplification curve of the associated sample as valid. In other words: the preferred embodiment of the method is also advantageous, since it can be checked here whether the sample of the positive control sample and also the associated sample of the amplification curve to be classified were processed correctly in the course of the real-time PCR. If correct processing of the positive control sample and the negative control sample were not established because at least one of the secondary criteria is not met, it can thus be concluded that the real-time PCR amplification curves of the associated samples are to be classified as not valid.

Furthermore, the quality metric is preferably determined as a quality metric of a linear regression with respect to the real-time PCR amplification curve to be classified.

Furthermore, the first criterion is preferably determined by checking whether the quality metric of the linear regression falls below the first predefined value.

Furthermore, the method preferably includes
determining the last fluorescence value of the real-time PCR amplification curve to be classified,
and classifying the real-time PCR amplification curve of the associated sample as a positive curve in dependence on the last fluorescence value of the real-time PCR amplification curve to be classified.

The PCR amplification curve is only classified as a positive curve here if the last fluorescence value (LFL) exceeds a further predefined value (VW4). A quality of the classification result can be increased once again by the classification of the amplification curve of the associated sample as a positive curve in dependence on the last fluorescence value.

Furthermore, a device for the qualitative evaluation of real-time PCR data is proposed. The device for qualitative evaluation of real-time PCR data has a storage unit for providing a real-time PCR amplification curve to be classified having at least 20 chronologically successive amplitude values of corresponding chronologically successive PCR cycle indices of an associated sample. Furthermore, the device has a processing unit for determining a quality metric, preferably a single quality metric, which indicates a similarity of the real-time PCR amplification curve to be classified to a straight line, on the basis of the at least 20 chronologically successive amplitude values of corresponding chronologically successive PCR cycle indices. The processing unit is furthermore designed to determine a first criterion via a comparison of the quality metric to a first predefined value, wherein the first criterion is met if the quality metric falls below the first predefined value. The processing unit is furthermore designed to determine a value sequence which indicates a slope of the real-time PCR amplification curve to be classified, and furthermore to determine a second criterion as to whether the value sequence exceeds a first predefined value, wherein the second criterion is met if at least one value of the value sequence exceeds the second predefined value. The processing unit classifies the real-time PCR amplification curve of the associated sample as a negative curve or as a positive curve, wherein the processing unit classifies the real-time PCR amplification curve of the associated sample as a positive curve in the case that all above-mentioned criteria are met. The device is preferably designed in further forms which correspond to the further preferred embodiments of the proposed method.

Furthermore, a computer-implemented method for the qualitative evaluation of real-time PCR data is proposed, wherein a real-time PCR amplification curve of an associated sample is classified as a negative curve or as a positive curve, including the steps of accepting the real-time PCR amplification curve to be classified having at least 20 chronologically successive amplitude values of corresponding chronologically successive PCR cycle indices of the associated sample, determining a quality metric, preferably a single quality metric, which indicates a similarity of the real-time PCR amplification curve to be classified to a straight line, on the basis of the at least 20 chronologically successive amplitude values of corresponding chronologically successive PCR cycle indices, determining a first criterion via a comparison of the quality metric to a first predefined value, wherein the first criterion is met if the quality metric falls below the first predefined value, determining a value sequence which indicates a slope of the real-time PCR amplification curve to be classified, and determining a second criterion as to whether the value sequence exceeds a second predefined value, wherein the second criterion is met if at least one value of the value sequence (MK1') exceeds the second predefined value and finally classifying the real-time PCR amplification curve of the associated sample as a positive curve in the case that all above-mentioned criteria are met. The computer-implemented method is preferably designed in further forms which correspond to the further preferred embodiments of the proposed method.

Furthermore, a computer program product is proposed, comprising commands which, upon execution of the program by a computer, cause it to carry out the computer-implemented method.

The invention is explained in more detail on the basis of figures hereinafter on the basis of particular embodiments without restriction of the general concept of the invention.

BRIEF DESCRIPTION OF THE DRAWINGS

In the Figures:

FIG. 12 shows different tables of different test results for different test sets.

FIG. 6 shows different amplification curves K1, K2. The fluorescence intensity F is plotted over the cycle time Z. The curve K1, which has a sigmoid slope, is to be classified as a positive curve. The curve K2, which has no or rather an early linear rise, is to be classified as negative. The curves K1, K2 are scaled to a value range 0 . . . 1. The curves K1 and K2 have at least 20 chronologically successive amplitude values of corresponding chronologically successive PCR cycle indices.

DETAILED DESCRIPTION OF THE INVENTION

The PCR amplification curves preferably have at least 20, in particular at least 25, preferably at least 30, particularly preferably at least 35, very particularly preferably at least 40 chronologically successive amplitude values of corresponding chronologically successive PCR cycle indices. The quality metric is preferably determined on the basis of the at least 20 chronologically successive amplitude values of corresponding chronologically successive PCR cycle indices, in particular at least 25, preferably at least 30, particularly preferably at least 35, very particularly preferably at least 40 chronologically successive amplitude values of corresponding chronologically successive PCR cycle indices.

The PCR amplification curve preferably does not have the amplitude values of the first 3, preferably the first 4, particular preferably the first 5 PCR cycle indices, so that these remain unconsidered. This permits not allowing early amplitude values to be incorporated in the assessment, since such early amplitude values sometimes have undesired interference variables and do not follow the zero line, which should actually be the case.

A processing or evaluation of the curve K1 is further explained precisely in more detail hereinafter as an example. Corresponding processing values for the curve K2 are also illustrated in the further figures.

Figure 3:
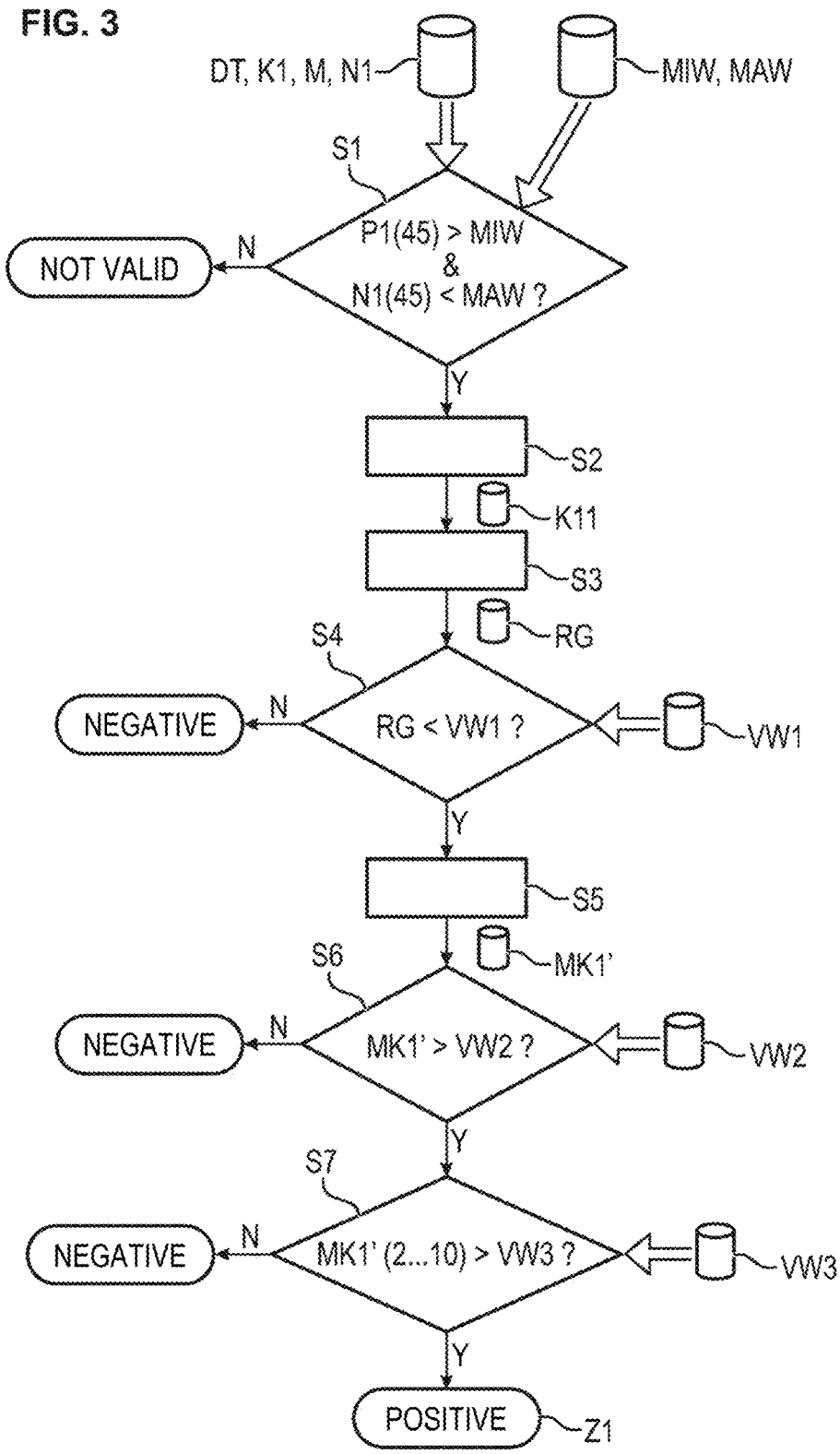
FIG. 3 shows preferred steps for carrying out a preferred embodiment of the proposed method.
Figure 5:
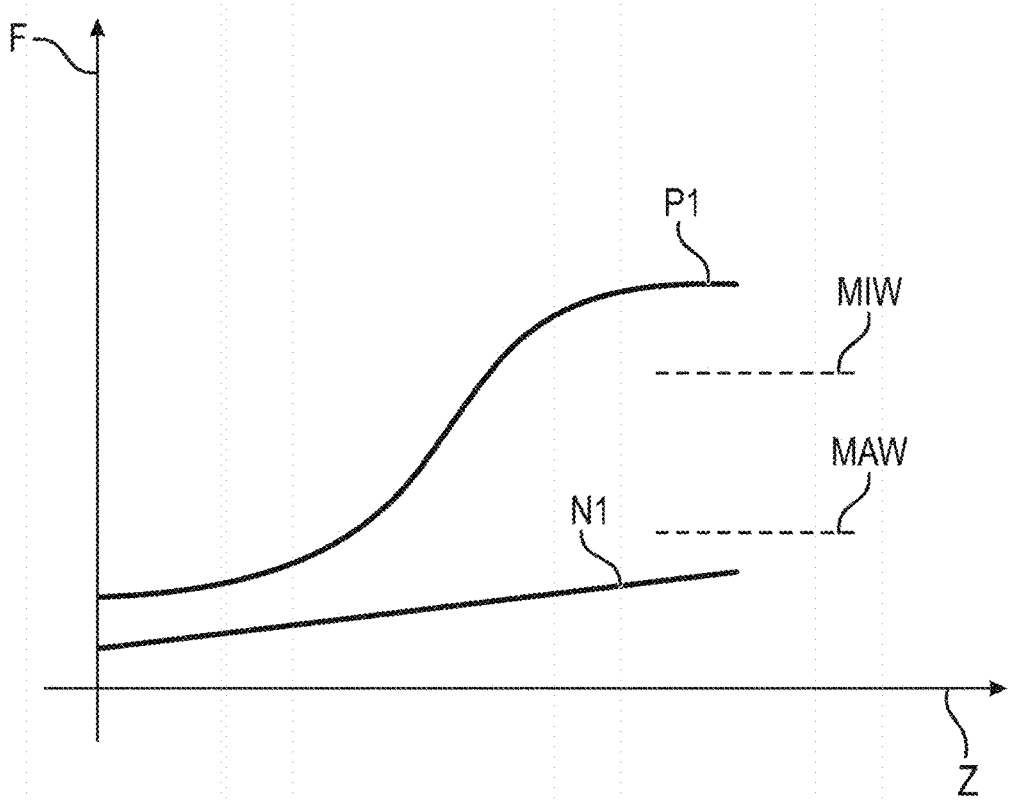
FIG. 5 shows exemplary amplification curves of a positive control sample and a negative control sample.

According to FIG. 3, the amplification curve K1 can be provided as a data set DT. FIG. 5 shows an exemplary illustration of an amplification curve P1 of a positive control sample from the same test run and an exemplary illustration of an amplification curve N1 of a negative control sample from the same test run. Furthermore, the amplification curve P1 of the positive control sample and the amplification curve N1 of the negative control sample from the same test run are preferably provided, preferably via the same data set DT or a further data set (not shown in greater detail here). Preferably, provided amplification curves of the positive control sample PK and the negative control sample NK can also originate from a different test run than the amplification curves of the one sample P or else the multiple samples P, if they were generated under the same processing conditions, and are provided via a further data set (not shown in greater detail here).

Predefined values MIW, MAW are preferably also provided.

In a first step S1, the amplification curves P1, N1 from FIG. 5 can then preferably be checked on the basis of the predefined values MIW and MAW. It is checked here whether the amplification curve P1 of the positive control sample exceeds a minimum end fluorescence, given by that of the predefined value MIW, at the last cycle index or with its last fluorescence value. In this way, it is checked, for example, whether the processing conditions within the device G from FIG. 2 were maintained accordingly. It can also be checked in this way whether, for example, the PCR reagents have still functioned and whether they were pipetted together correctly. It can also be checked whether the formulations were correctly pipetted.

Furthermore, it is also checked whether the amplification curve N1 of the negative control sample does not exceed a maximum end fluorescence, given by the predefined value MAW, at the last cycle index or with its last fluorescence value. In this way, reagent contaminations for example of the PCR reagents or the reagents used for the sample extraction with the target sequence to be detected can be revealed. If the formulation of the negative control sample were contaminated, the last fluorescence value of the curve N1 would exceed the predefined value MAW.

A first secondary criterion, as to whether the last fluorescence value of the amplification curve of the positive control sample has exceeded a minimum value, is thus determined, and also a second secondary criterion, as to whether the last fluorescence value of the amplification curve of the negative control sample has not exceeded a maximum value. The curve P1 of the positive control sample and the curve K1 of the negative control sample are then considered to be valid and then both secondary criteria are considered to be met. If both secondary criteria are met, it is thus concluded that the amplification curve K1 of the associated sample P is also valid in principle and the sequence then therefore passes to step S2. If at least one of the secondary criteria is not met, it is thus concluded that the amplification curve K1 of the associated sample is not valid and then the method is terminated.

Further secondary criteria can preferably be determined and checked for further, preferably control samples (for example an internal control or an endogenous control) and associated curves. An internal control can be necessary, for example, to show that an extraction of nucleic acids from a patient sample has run successfully. However, an execution of these further secondary criteria in the further method only takes place preferably.

Figure 6:
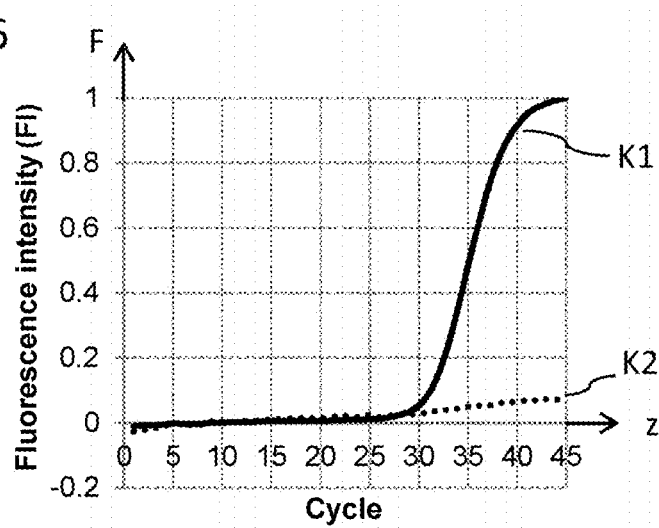
FIG. 6 shows amplification curves of samples.

FIG. 6 shows the amplification curve K1 considered of the associated sample. Furthermore, FIG. 6 shows a further amplification curve K2 as an example of a negative curve.

Figure 7:
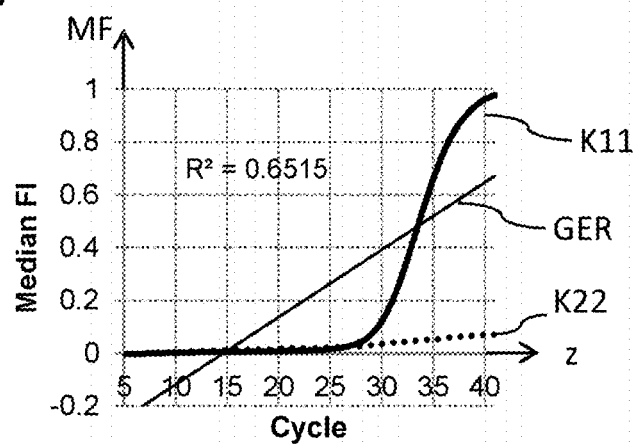
FIG. 7 shows modified amplification curves and a straight line.

In a step S2, a median filtering of the curve K1 from FIG. 6 preferably takes place, so that the modified amplification curve K11 from FIG. 7 results. This applies similarly to the curves K2 and K21 from FIGS. 6 and 7, respectively.

The median filtering preferably takes place in such a way that three values of the amplification curve K1 are always supplied to a median filter and the resulting value then defines a value of the curve K11. The median filter can be implemented as a moving filter.

In a step S3, a quality metric RG is then determined, which indicates a similarity of the modified real-time PCR amplification curve K11 to a straight line. Preferably, in step S3, the quality metric RG is determined as a quality metric of a linear regression with respect to the real-time PCR amplification curve to be classified. This is preferably carried out by determining a linear regression straight line GER, shown in FIG. 7, and by determining the quality metric RG as a coefficient of determination $R^2$, also called a determination coefficient, which is in particular a measure to judge the matching quality of the real-time PCR amplification curve to be classified to the linear regression straight line GER. A corresponding regression straight line is not shown in FIG. 7 for the curve K21.

The quality metric RG can be understood as a quality metric of a similarity of the modified real-time PCR amplification curve K11 to a straight line and also as a quality metric of a similarity of the real-time PCR amplification curve K1 to be classified to a straight line.

In a first preferred embodiment, the quality metric is the coefficient of determination of the linear regression, also called empirical coefficient of determination; this coefficient of determination is also called the $R^2$ value. In a second preferred embodiment, the quality metric is the standard error of regression or the standard error of linear regression.

In a step S4, a first predefined value VW1 is then provided. A first criterion is then determined via a comparison of the quality metric RG to a first predefined value VW1. It is preferably determined as the first criterion whether the quality metric RG falls below the predefined value VW1. It is particularly preferably determined as the first criterion whether the coefficient of determination R2 of the linear regression with respect to the amplification curve K1 to be classified falls below the predefined value VW1. If the first criterion is not met, the amplification curve K1 is thus classified as negative. The first predefined value VW1 is preferably a value between 0.92 and 0.99.

If the first criterion is met, the sequence then progresses to step S5. The curve K1 is thus considered to be potentially positive.

Figure 8:
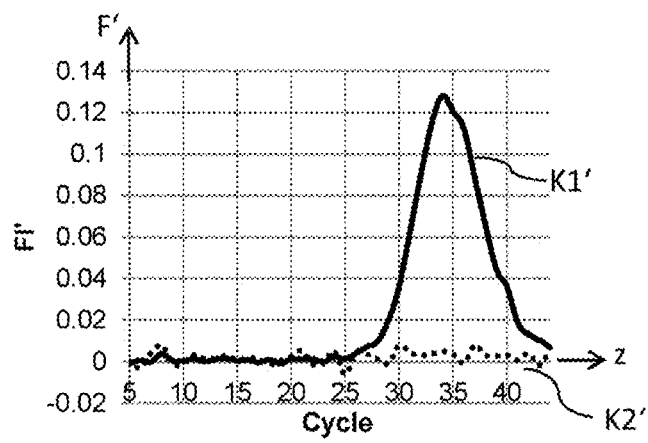
FIG. 8 shows curves which represent a slope behavior of the amplification curves from FIG. 6.

In step S5, initially a slope curve K1', see FIG. 8, is determined for with respect to the curve K1 from FIG. 6. The slope curve K2' for the curve K2 from FIG. 6 is also indicated by way of example in FIG. 8.

Figure 9:
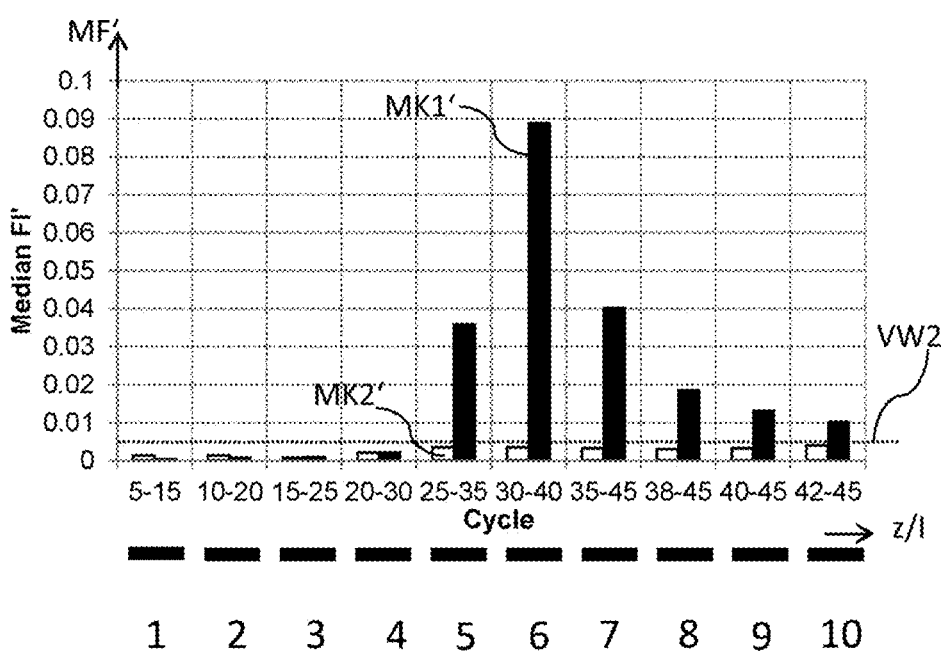
FIG. 9 shows value sequences which indicate respective slopes of the respective amplification curves from FIG. 6.

Furthermore, the slope curve K1' from FIG. 8 is subjected to median filtering in step S5, so that filtered slope values MF' result. The bar graph from FIG. 9 shows a resulting value sequence MK1' for this purpose, which indicates a slope K' of the amplification curve K1 to be classified from FIG. 6. Furthermore, a value sequence MK2' is also illustrated, which indicates a slope K2' of the curve K2 from FIG. 6. FIG. 9 shows for this purpose, for index values I from 1 to 10 and above, the corresponding cycle values correspondingly illustrated in each case, which are combined via median filtering. Furthermore, the second predefined value VW2 is shown.

A second predefined value VW2 is then provided in a step S6. The second predefined value is preferably a value between 0.002 and 0.01.

In a step S6, it is then determined as a second criterion whether at least one value of the value sequence MK1' exceeds the second predefined value VW2. If this is not the case, the curve K1 is thus classified as a negative curve. If the second criterion is met, the sequence then passes to a step S7, so that the curve K1 is classified as a potential positive curve.

Therefore, the real-time PCR amplification curve is then classified as a positive curve if the first and the second criterion are met.

In summary, it may thus be stated that in the method according to the invention, an amplification curve K1 is provided, then a quality metric is determined, which indicates a similarity of the real-time PCR amplification curve to be classified to a straight line, a first criterion is then determined via a comparison of the quality metric to a first predefined value, furthermore a value sequence MK1' is determined, which indicates a slope of the amplification curve K1 to be classified, and furthermore a second criterion is determined as to whether the value sequence MK1' exceeds a second predefined value VW2.

The quality metric is preferably determined as a quality metric of a linear regression with respect to the real-time PCR amplification curve to be classified. Furthermore, the first criterion is preferably determined by a check as to whether the quality metric of the linear regression falls below the first predefined value, the one first criterion as to whether a quality metric of a linear regression with respect to the amplification curve K1 to be classified falls below a first predefined value VW1.

Furthermore, it can be stated in summary that in the method according to the invention, the amplification curve K1 is then classified as a positive curve if the first and the second criterion are met.

The value sequence MK2' in FIG. 9 indicates corresponding values with respect to the curve K2 from FIG. 6.

In step S7, which is preferably to be carried out, a third predefined value VW3 is then provided. This predefined value is preferably a multiple of the first value of the median-filtered value sequence MK1'. This predefined value is preferably 1.5 to 3 times the first value of the value sequence MK1', thus 1.5-3 times the value MK1' (1). It is then determined as a criterion whether the value sequence MK1', which indicates the slope of the amplification curve K1 to be classified, exceeds the third predefined value VW3. It is checked here whether one of the values MK1' (2 . . . 10) of the indices 2 to 10 of the sequence MK1' exceeds the third predefined value VW3. If this is the case, the sequence passes to the state Z1 and the amplification curve K1 is classified as positive. If this is not the case, the sequence accordingly passes to step S3 and the amplification curve K1 is classified as negative.

Figure 4:
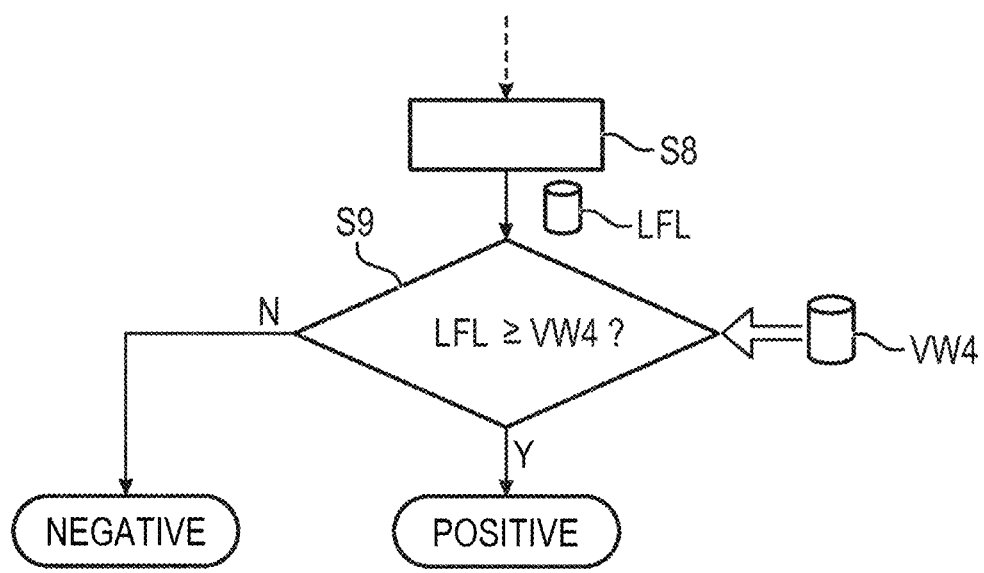
FIG. 4 shows further preferred steps for carrying out a preferred embodiment of the proposed method.

A classification of the amplification curve K1 of the associated sample can preferably be carried out in a more accurate manner by carrying out further steps from FIG. 4, which can follow step S7 from FIG. 3. A classification of the amplification curve K1 is then not completed after step S7, but rather only after carrying out further steps from FIG. 4.

In a step S8, the last fluorescence value of the last cycle index of the amplification curve K1 to be classified is determined. This is the value LFL in FIG. 4.

The classification of the amplification curve K1 of the associated sample then preferably takes place in dependence on the last fluorescence value LFL of the amplification curve K1 to be classified.

In step S9, the last fluorescence value LFL of the curve K1 to be classified is then compared to a predefined value VW4, which preferably has a value between 0.05 and 0.2. If the last fluorescence value LFL of the curve K1 is greater than the predefined value VW4, the curve K1 is thus classified as positive, otherwise as negative.

Figure 10:
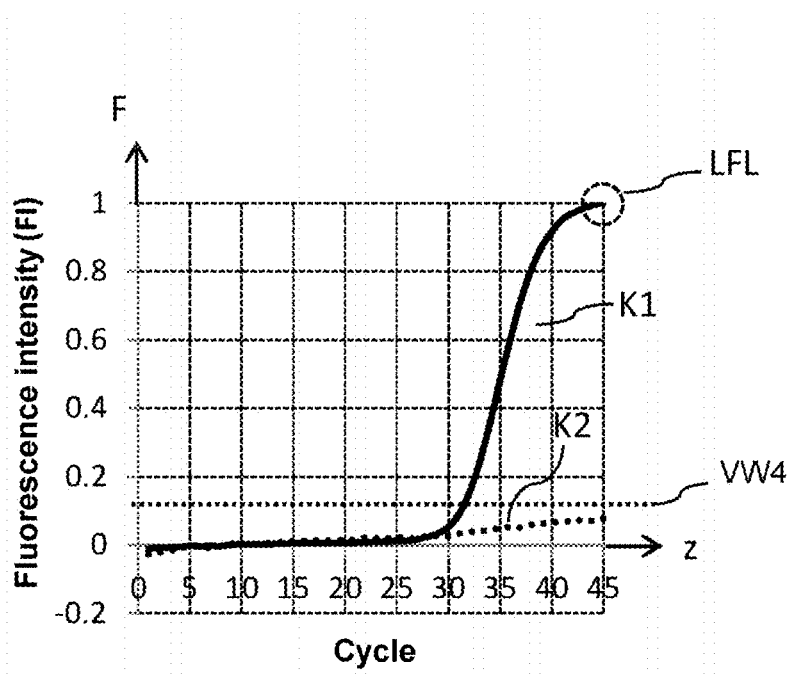
FIG. 10 shows the amplification curves from FIG. 6 and a predefined value.

For this purpose, FIG. 10 shows the curves K1, K2 and the last fluorescence value LFL of the curve K1. Furthermore, FIG. 10 shows as a comparison value the value VW4, which is preferably in the range of 0.05 to 0.2. Since this criterion is met for the curve K1, in step S9, the curve K1 is then classified as a positive curve.

Figure 11:
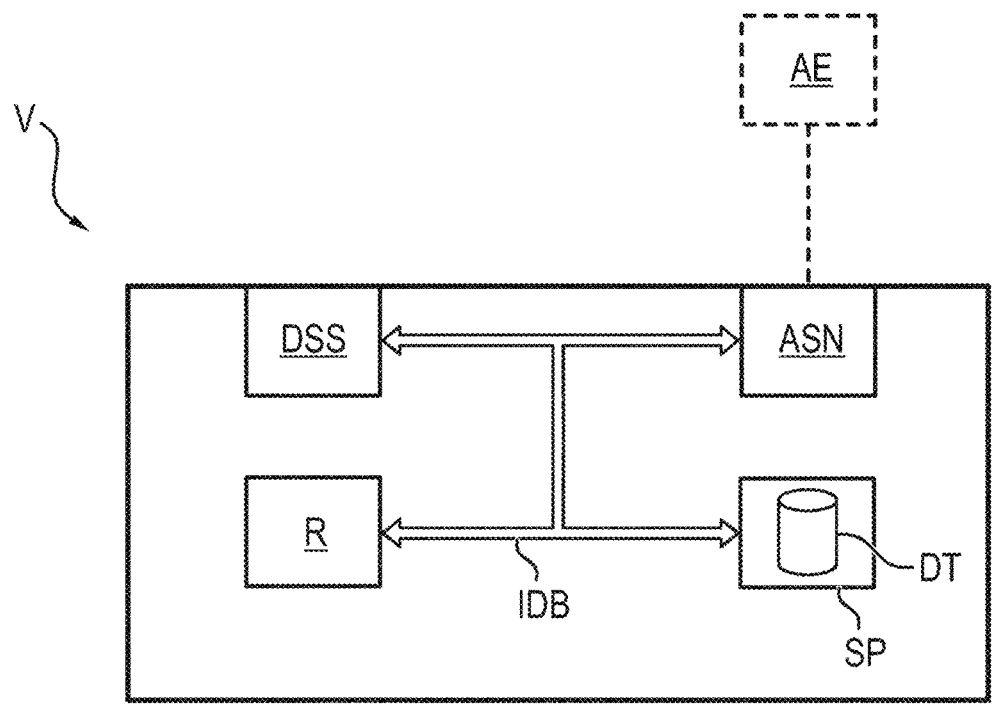
FIG. 11 shows a preferred embodiment of the proposed device.

FIG. 11 shows a proposed device V for the qualitative evaluation of real-time PCR data.

The device V has a processing unit R and a storage unit SP. The storage unit SP can store data DT, which preferably represent data of PCR amplification curves having at least 20 chronologically successive amplitude values of corresponding chronologically successive PCR cycle indices of an associated sample. The device V preferably has a data interface DSS for accepting values which represent application curves. The data interface DSS is preferably an internal interface in the case that the device V itself is a PCR device and can measure corresponding amplification curves or their values.

Figure 1:
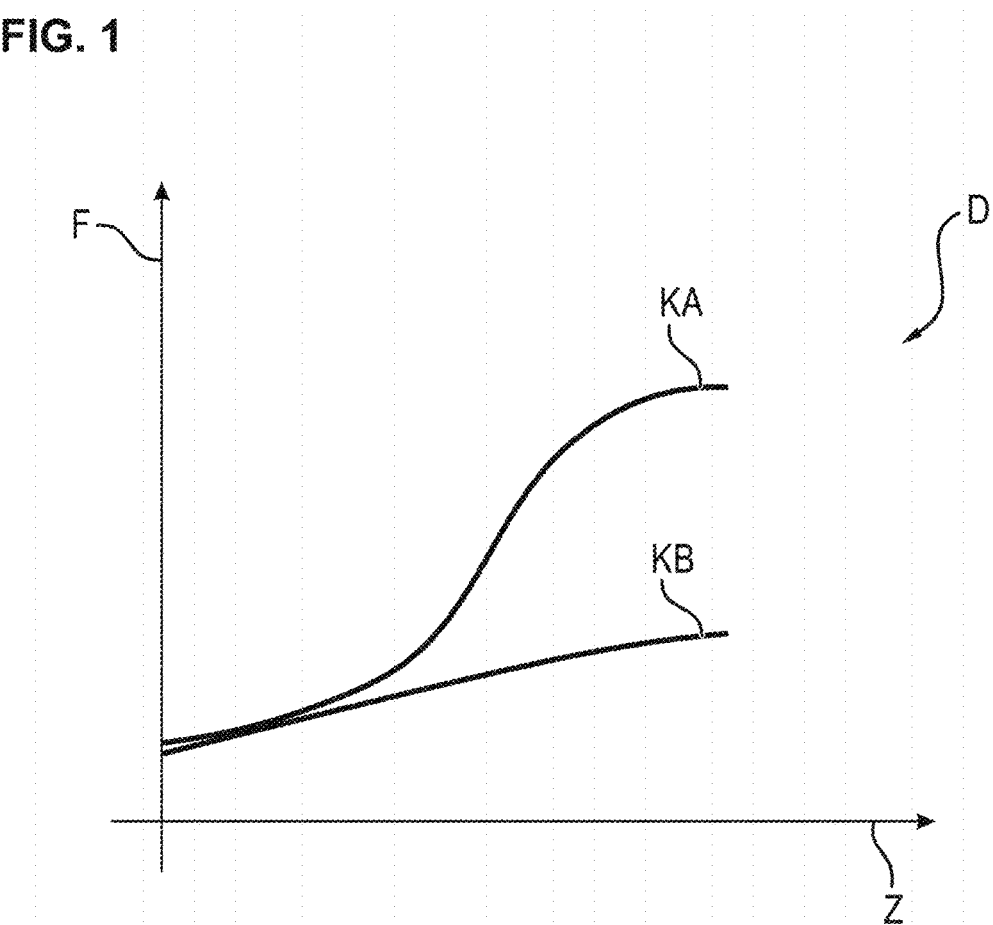
FIG. 1 shows exemplary amplification curves.
Figure 2:
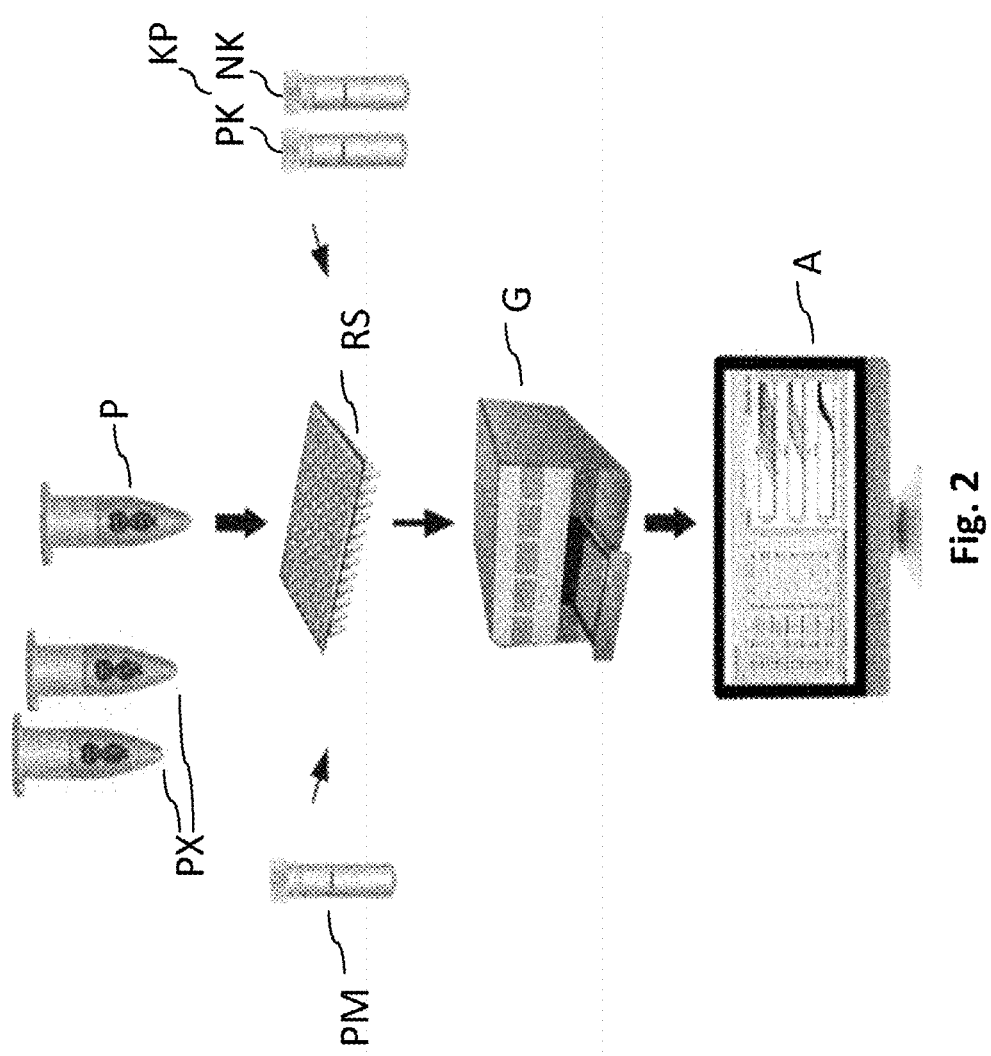
FIG. 2 shows the principle of the use of multiple samples and of control samples and reagents in a test run.

The device V preferably has an output interface ASN, which is preferably connected or connectable to an output unit AE in the form of a display screen or a display A from FIG. 2.

The processing unit R and the storage unit SP are preferably connected to one another via an internal data bus IDB. The connection via the internal data bus is preferably also provided toward the data interface DSS and also preferably to the output interface ASN.

The storage unit SP is designed to store and provide the amplification curve K1 to be classified of the associated sample. The storage unit SP is also preferably designed to provide further amplification curves of further samples, such as also the positive control sample and the negative control sample.

The processing unit R is designed to determine a quality metric, preferably a single quality metric, which indicates a similarity of the real-time PCR amplification curve to be classified to a straight line, on the basis of the at least 20 chronologically successive amplitude values of corresponding chronologically successive PCR cycle indices, and furthermore to determine a first criterion via a comparison of the quality metric to a first predefined value, wherein the first criterion is met if the quality metric falls below the first predefined value. The processing unit R preferably determines the quality metric as a quality metric of a linear regression with respect to the real-time PCR amplification curve to be classified. The processing unit R preferably determines a linear regression straight line and furthermore the quality metric as a coefficient of determination $R^2$, also called a determination coefficient, which in particular is a measure for judging the matching quality of a real-time PCR amplification curve to be classified to the linear regression straight line. In one preferred embodiment, the processing unit determines the quality metric as a standard error of regression or as a standard error of linear regression.

The processing unit thus determines a first criterion via a comparison of the quality metric to a first predefined value. The processing unit preferably determines as the first criterion whether the quality metric falls below the predefined value. The processing unit particularly preferably determines as the first criterion whether the coefficient of determination $R^2$ of linear regression with respect to the amplification curve to be classified falls below the predefined value. In a second preferred embodiment, the processing unit determines the quality metric as a standard error of regression or as a standard error of linear regression.

Furthermore, the processing unit R is designed to determine a value sequence, which indicates a slope of the amplification curve K1 to be classified, and to determine a second criterion as to whether the value sequence exceeds a second predefined value, wherein the second criterion is met if at least one value of the value sequence exceeds the second predefined value.

The processing unit classifies the amplification curve K1 of the associated sample as a negative curve or as a positive curve. The processing unit classifies the amplification curve K1 of the associated sample as a positive curve in the case that the two criteria with respect to the first and the second predefined value are met.

Furthermore, a computer-implemented method qualitative evaluation of real-time PCR data is proposed, wherein a real-time PCR amplification curve having at least 20 chronologically successive amplitude values of corresponding chronologically successive PCR cycle indices of an associated sample is classified as a negative curve or as a positive curve, including the steps: accepting the real-time PCR amplification curve to be classified of the associated sample, determining a quality metric, preferably a single quality metric, which indicates a similarity of the real-time PCR amplification curve to be classified to a straight line, on the basis of the at least 20 chronologically successive amplitude values of corresponding chronologically successive PCR cycle indices, determining a first criterion via a comparison of the quality metric to a first predefined value, wherein the first criterion is met if the quality metric falls below the first predefined value, determining a value sequence which indicates a slope of the real-time PCR amplification curve to be classified, and determining a second criterion as to whether the value sequence exceeds a second predefined value, wherein the second criterion is met if at least one value of the value sequence exceeds the second predefined value, classifying the real-time PCR amplification curve of the associated sample as a positive curve in the case that all above-mentioned criteria are met.

Furthermore, a computer program product is proposed, comprising commands which, upon execution of the program by a computer, cause it to carry out the computer-implemented method.

Although some aspects were described in conjunction with a device, it is apparent that these aspects also represent a description of the corresponding method, so that a block or a component of a device is also to be understood as a corresponding method step or as a feature of a method step. Similarly thereto, aspects which were described in conjunction with a or as a method step also represent a description of a corresponding block or detail or feature of a corresponding device.

Depending on the specific implementation requirements, exemplary embodiments of the invention can be implemented in hardware or in software. The implementation can be carried out using a digital storage medium, for example a floppy disk, a DVD, a Blu-ray disk, a CD, a ROM, a PROM, an EPROM, an EEPROM, or a FLASH memory, a hard drive, or another magnetic or optical memory, on which electronically readable control signals are stored which can interact or interact with a programmable hardware component in such a way that the respective method is carried out.

A programmable hardware component as a processing unit can be formed by a processor, a computer processor (CPU=Central Processing Unit), a graphics processor (GPU=Graphics Processing Unit), a computer, a computer system, an application-specific integrated circuit (ASIC), an integrated circuit (IC), a one-chip system (SOC=System on Chip), a programmable logic element, or a field-programmable gate array having a microprocessor (FPGA).

The digital storage medium can therefore be machine-readable or computer-readable. Some exemplary embodiments thus comprise a data carrier which has electronically readable control signals which are capable of interacting with a programmable computer system or a programmable hardware component in such a way that one of the methods described herein is carried out. One exemplary embodiment is thus a data carrier (or a digital storage medium or a computer-readable medium), on which the program for carrying out one of the methods described herein is recorded.

In general, exemplary embodiments of the present invention can be implemented as a program, firmware, computer program, or computer program product having a program code or as data, wherein the program code or the data is or are active so as to carry out one of the methods when the program runs on a processor or a programmable hardware component. The program code or the data can also be stored, for example, on a machine-readable carrier or data carrier. The program code or the data can be provided, inter alia, as source code, machine code, or byte code and as other intermediate code.

A further exemplary embodiment is furthermore a data stream, a signal sequence, or a sequence of signals which represent the program for carrying out one of the methods described herein. The data stream, the signal sequence, or the sequence of signals can be configured, for example, so as to be transferred via a data communication connection, for example via the Internet or another network. Exemplary embodiments are thus also signal sequences representing data which are suitable for transmission via a network or a data communication connection, wherein the data represent the program.

RESULTS

FIG. 12 shows experimental results by processing according to the corresponding test instructions for the product EURORealTime Zika virus in table T11. The corresponding fluorescence curves were evaluated via the described method and compared to the previous manual evaluation method from the corresponding test instructions. 2921 positive sample curves ("detected") were reliably correctly recognized by the described method. 1937 negative curves ("not detected") were also reliably correctly detected. In the case of 2 curves, the type of curve was assessed as a positive curve deviating from the manual evaluation method. Table T12 shows for this purpose the correspondence of the degree 0.9996. Correspondence here is a correspondence of the decisions of the proposed method with respect to the actual presence or absence of the target sequence to be detected.

Corresponding results for the product EURORealTime MTB (devices: LightCycler® 480 II (Roche) and 7500/7500 Fast Real-Time PCR Instrument (Applied Biosystems)) are shown in tables T21 and T22. A correspondence of degree 1 results here.

For the product EURORealTime HSV 1/-2, corresponding results are found in tables T31 and T32. A correspondence of the degree 0.9999 results here. The devices used here were: LightCycler® 480 II (Roche) and 7500/7500 Fast Real-Time PCR Instrument (Applied Biosystems).

The invention claimed is:

1. A computer-implemented method for improving real-time PCR by the qualitative evaluation of real-time PCR data (DT), wherein a real-time PCR amplification curve (K1) of an associated sample (P) is classified as a negative curve or as a positive curve, the method comprising:
   providing real-time PCR reagents including an associated sample (P) including DNA having a target sequence, primers, DNA polymerase, free nucleotides and DNA-intercalating fluorescent pigments or sequence-specific fluorescence-labeled DNA probes;
   conducting real-time PCR cycles each so as to copy said target sequence by denaturing, primer hybridization and elongation in the associated sample (P);
   carrying out successive said PCR cycles of the associated sample (P);
   optically measuring fluorescence intensity at the end of each of said PCR cycles;
   providing the real-time PCR amplification curve (K1) of the associated sample (P),
   wherein the real-time PCR amplification curve (K1) has at least 20 chronologically successive amplitude values of corresponding chronologically successive PCR cycle indices of the associated sample (P),
   determining a quality metric (RG), which indicates a similarity of the real-time PCR amplification curve (K1) to a straight line (GER), as a quality metric of a linear regression with respect to the real-time PCR amplification curve (K1),
   wherein the determining of the quality metric (RG), is on a basis of the at least 20 chronologically successive amplitude values of corresponding chronologically successive PCR cycle indices,
   determining a first criterion by checking whether the quality metric (RG) of the linear regression falls below a first predefined value (VW1),
   determining a value sequence (MK1'), which indicates a slope of the real-time PCR amplification curve (K1), and determining a second criterion as to whether the value sequence (MK1') exceeds a second predefined value (VW2), and
   classifying the real-time PCR amplification curve (K1) of the associated sample (P) as a positive curve in the case that the first criterion and the second criterion are met or as a negative curve if not met,
   wherein when the real-time PCR amplification curve (K1) is classified as a positive curve this is indicative of a presence of the DNA having the target sequence in the real-time PCR and that the real-time PCR reagents functioned properly and were correctly measured, and
   wherein when the real-time PCR amplification curve (K1) is classified as a negative curve this is indicative of no presence of the DNA having the target sequence in the real-time PCR, or that the real-time PCR reagents did not function properly or were not correctly measured.

2. The computer-implemented method as claimed in claim 1, further comprising:
   determining a third criterion as to whether the value sequence (MK1'), which indicates a slope of the real-time PCR amplification curve, exceeds a third predefined value (VW3), and
   classifying the real-time PCR amplification curve (K1) of the associated sample (P) as a positive curve in the case that the third criterion is met.

3. The computer-implemented method as claimed in claim 1, further comprising:
   providing a real-time PCR amplification curve (P1) of a positive control sample (PK) and a real-time PCR amplification curve (N1) of a negative control sample (NK),
   determining a first secondary criterion as to whether a last fluorescence value of the real-time PCR amplification curve (P1) of the positive control sample (PK) has exceeded a minimum value (MIW),
   determining a second secondary criterion as to whether a last fluorescence value of the real-time PCR amplification curve (N1) of the negative control sample (NK) has not exceeded a maximum value (MAW),
   classifying the real-time PCR amplification curve (K1) of the associated sample (P) as not valid if at least one of the first secondary criterion and the second secondary criterion is not met.

4. The computer-implemented method as claimed in claim 1,
   wherein the quality metric (RG) is determined as a quality metric of a linear regression with respect to the real-time PCR amplification curve (K1), and
   wherein the first criterion is determined by checking whether the quality metric (RG) of the linear regression falls below the first predefined value (VW1).

5. The computer-implemented method as claimed in claim 1, further comprising:
   determining a last fluorescence value (LFL) of the real-time PCR amplification curve (K1), and
   classifying the real-time PCR amplification curve (K1) of the associated sample (P) as a positive curve as a function of the last fluorescence value (LFL) of the real-time PCR amplification curve (K1).

6. The computer-implemented method as claimed in claim 1, comprising:
   providing a device (V) for qualitative evaluation of real-time PCR data, including:
   a memory for providing the real-time PCR amplification curve (K1) of an associated sample (P) having the at least 20 chronologically successive amplitude values of corresponding chronologically successive PCR cycle indices of an associated sample (P),
   and a processor
   for determining the quality metric (RG), which indicates a similarity of the real-time PCR amplification curve (K1) to a straight line (GER), as a quality metric of a linear regression with respect to the real-time PCR amplification curve (K1), on a basis of the at least 20 chronologically successive amplitude values of corresponding chronologically successive PCR cycle indices,
   for determining the first criterion by checking whether the quality metric (RG) of the linear regression falls below the first predefined value (VW1), and
   for determining the value sequence (MK1'), which indicates a slope of the real-time PCR amplification curve (K1), and for determining the second criterion as to whether the value sequence (MK1') exceeds a second predefined value (VW2),
   wherein the processor classifies the real-time PCR amplification curve (K1) of the associated sample (P) as a negative curve or as a positive curve, and
   wherein the processor classifies the real-time PCR amplification curve (K1) of the associated sample (P) as a positive curve in the case that the first criterion and the second criterion are met.

7. The computer-implemented method (V) according to claim 6, wherein the quality metric (RG) is a single quality metric.

8. The computer-implemented method according to claim 7, wherein the quality metric (RG) is a single quality metric.

9. The computer-implemented method as claimed in claim 6,
   wherein the memory is a digital storage medium; and
   wherein the processor is a computer processor, a graphics processor, a computer, a computer system, an application-specific integrated circuit, an integrated circuit, a one-chip system, a programmable logic element, or a field-programmable gate array having a microprocessor.

10. The computer-implemented method as claimed in claim 9, wherein the digital storage medium is a floppy disk, a DVD, a Blu-ray disk, a CD, a ROM, a PROM, an EPROM, an EEPROM, a FLASH memory, a hard drive, or another magnetic or optical memory.

11. The computer-implemented method as claimed in claim 1,
   wherein the first criterion is met if the quality metric (RG) falls below the first predefined value (VW1), and
   wherein the second criterion is met if at least one value of the value sequence (MK1') exceeds the second predefined value (VW2).

12. The computer-implemented method according to claim 1, wherein the quality metric (RG) is a single quality metric.

13. The computer-implemented method as claimed in claim 1, further comprising:
   filtering the value sequence (MK1'), which indicates a slope of the real-time PCR amplification curve (K1), via a median filter,
   determining a third criterion as to whether the median-filtered value sequence (MK1') exceeds a third predefined value (VW3), and
   classifying the real-time PCR amplification curve (K1) of the associated sample (P) as a positive curve in the case that the third criterion is met.

14. The computer-implemented method as claimed in claim 1, further comprising:
   determining a last fluorescence value (LFL) of the real-time PCR amplification curve (K1), and
   classifying the real-time PCR amplification curve (K1) of the associated sample (P) as a positive curve as a function of the last fluorescence value (LFL) of the real-time PCR amplification curve (K1),
   wherein the real-time PCR amplification curve (K1) is only classified as a positive curve if the last fluorescence value (LFL) exceeds one further standard value (VW4).

15. The computer-implemented method as claimed in claim 1, wherein the real-time PCR amplification curve (K1) does not have amplitude values of first at least 3 PCR cycle indices.

16. A computer-implemented method for the qualitative evaluation of real-time PCR data (DT), wherein a real-time PCR amplification curve (K1) of an associated sample (P) is classified as a negative curve or as a positive curve, the method comprising:

providing real-time PCR reagents including an associated sample (P) including DNA having a target sequence, primers, DNA polymerase, free nucleotides and DNA-intercalating fluorescent pigments or sequence-specific fluorescence-labeled DNA probes;

conducting real-time PCR cycles each so as to copy said target sequence by denaturing, primer hybridization and elongation in the associated sample (P);

carrying out successive said PCR cycles of the associated sample P;

optically measuring fluorescence intensity at the end of each of said PCR cycles;

providing the real-time PCR amplification curve (K1) of the associated sample (P), wherein the real-time PCR amplification curve (K1) has at least 20 chronologically successive amplitude values of corresponding chronologically successive PCR cycle indices of the associated sample (P), determining a linear regression straight line (GER), and determining a quality metric (RG) as a coefficient of determination $R^2$, which indicates a similarity of the real-time PCR amplification curve (K1) to the straight line (GER), as a quality metric of a linear regression with respect to the real-time PCR amplification curve (K1), wherein the determining of the quality metric (RG), is on a basis of the at least 20 chronologically successive amplitude values of corresponding chronologically successive PCR cycle indices, determining a first criterion by checking whether the quality metric (RG) of the linear regression falls below a first predefined value (VW1), determining a value sequence (MK1'), which indicates a slope of the real-time PCR amplification curve (K1), and determining a second criterion as to whether the value sequence (MK1') exceeds a second predefined value (VW2), and classifying the real-time PCR amplification curve (K1) of the associated sample (P) as a positive curve in the case that the first criterion and the second criterion are met or as a negative curve if not met, wherein when the real-time PCR amplification curve (K1) is classified as a positive curve this is indicative of a presence of the DNA having the target sequence in the real-time PCR and that the real-time PCR reagents functioned properly and were correctly measured, and wherein when the real-time PCR amplification curve (K1) is classified as a negative curve this is indicative of no presence of the DNA having the target sequence in the real-time PCR, or that the real-time PCR reagents did not function properly or were not correctly measured.

17. The computer-implemented method as claimed in claim 16, wherein the first criterion is met if the quality metric (RG) falls below the first predefined value (VW1), wherein the second criterion is met if at least one value of the value sequence (MK1') exceeds the second predefined value (VW2), and wherein the quality metric (RG) is a single quality metric.

18. The computer-implemented method as claimed in claim 16, wherein determining the quality metric (RG) as a coefficient of determination $R^2$ comprises determining the coefficient of determination $R^2$ on a processor.

* * * * *